(12) United States Patent
Campbell et al.

(10) Patent No.: US 11,001,155 B2
(45) Date of Patent: May 11, 2021

(54) ELECTRIC VEHICLE LITHIUM ION BATTERY CHARGING SYSTEM AND METHOD

(71) Applicant: SF Motors, Inc., Santa Clara, CA (US)

(72) Inventors: Brennan Campbell, Santa Clara, CA (US); Sangwoo Han, Santa Clara, CA (US); Scott Quinlan Freeman Monismith, Santa Clara, CA (US); Ying Liu, Santa Clara, CA (US)

(73) Assignee: SF MOTORS, INC., Santa Clara, CA (US)

( * ) Notice: Subject to any disclaimer, the term of this patent is extended or adjusted under 35 U.S.C. 154(b) by 98 days.

(21) Appl. No.: 16/247,119

(22) Filed: Jan. 14, 2019

(65) Prior Publication Data
US 2020/0223318 A1    Jul. 16, 2020

(51) Int. Cl.
*H02J 7/00* (2006.01)
*B60L 53/10* (2019.01)

(52) U.S. Cl.
CPC .......... *B60L 53/10* (2019.02); *B60L 2240/36* (2013.01)

(58) Field of Classification Search
CPC ...... B60L 53/10; B60L 2240/36; Y02T 90/14; Y02T 10/7005; Y02T 90/128; Y02T 10/7088; Y02T 90/163
See application file for complete search history.

(56) References Cited

U.S. PATENT DOCUMENTS

| | | | |
|---|---|---|---|
| 7,489,106 B1* | 2/2009 | Tikhonov | H02J 7/0018 320/116 |
| 2005/0083014 A1* | 4/2005 | Baumgartner | H02J 7/00041 320/116 |
| 2010/0138177 A1* | 6/2010 | Yu | G01R 31/367 702/63 |
| 2010/0306033 A1* | 12/2010 | Oved | G06Q 20/14 705/7.37 |
| 2011/0121790 A1* | 5/2011 | Brandon, II | H02J 7/0013 320/160 |
| 2011/0260694 A1* | 10/2011 | Bourilkov | H02J 7/00038 320/157 |
| 2012/0041623 A1* | 2/2012 | Hermann | B60L 1/003 701/22 |
| 2012/0169271 A1* | 7/2012 | Dvorkin | H01M 10/443 320/106 |
| 2012/0274287 A1* | 11/2012 | Ree | B60L 3/0046 320/162 |

* cited by examiner

*Primary Examiner* — Arun C Williams
(74) *Attorney, Agent, or Firm* — Foley & Lardner LLP; James De Vellis

(57) ABSTRACT

Systems and method manage battery charging of a battery of an electric vehicle are described herein. The system can include a battery management system. The battery management system can receive current battery characteristics and conditions. Based on the battery characteristics and conditions, the battery management system can select a charging profile from a plurality of charging profiles. Based on the selected charging profile, the battery management system can set a rate for charging the battery.

18 Claims, 5 Drawing Sheets

ELECTRIC VEHICLE LITHIUM ION BATTERY CHARGING SYSTEM AND METHOD

BACKGROUND

Vehicles such as automobiles can include batteries that provide power to components of the vehicle. The amount of power or the duration of power supplied by the battery can vary.

SUMMARY

According to at least one aspect of the disclosure a system to manage battery charging of an electric vehicle can include a data repository in communication with a battery management system. The data repository can store a plurality of charging profiles for a battery of the electric vehicle. Each of the plurality of charging profiles indicating a charging rate (e.g., C-rate) for charging the battery of the electric vehicle. The system can include a first sensor of the electric vehicle to determine a temperature value to indicate a temperature of a battery environment. The system can include a second sensor of the electric vehicle to determine a current value to indicate a current flow of the battery of the electric vehicle. The battery management system can include one or more processors. The battery management system can receive the temperature value and the current value. The battery management system can determine a state of charge of the battery of the electric vehicle. The battery management system can select a charging profile from the plurality of charging profiles for the battery of the electric vehicle based on the state of charge of the battery, the temperature value and the current value. The battery management system can set a C-rate to charge the battery of the electric vehicle based on the charging profile from the plurality of charging profiles.

According to at least one aspect of the disclosure a method to manage battery charging of an electric vehicle can include retrieving, from a data repository by a battery management system of the electric vehicle, a plurality of charging profiles for a battery of the electric vehicle. Each of the plurality of charging profiles can indicate a C-rate for charging to the battery of the electric vehicle. The method can include receiving, by the battery management system, a temperature value to indicate a temperature of a battery environment. The method can include determining, by the battery management system, a state of charge of the battery of the electric vehicle. The method can include selecting, by the battery management system, a charging profile from the plurality of charging profiles for the battery of the electric vehicle based on the state of charge of the battery and the temperature of the battery environment. The method can include setting a C-rate of the battery of the electric vehicle based on the charging profile from the plurality of charging profiles.

At least one aspect is directed to an electric vehicle. The electric vehicle includes a battery management system to manage battery charging of the electric vehicle. The battery management system can include a data repository in communication with a battery management system. The data repository can store a plurality of charging profiles for a battery of the electric vehicle. Each of the plurality of charging profiles indicating a charging rate (e.g., C-rate) for charging the battery of the electric vehicle. The system can include a first sensor of the electric vehicle to determine a temperature value to indicate a temperature of a battery environment. The system can include a second sensor of the electric vehicle to determine a current value to indicate a current flow of the battery of the electric vehicle. The battery management system can include one or more processors. The battery management system can receive the temperature value and the current value. The battery management system can determine a state of charge of the battery of the electric vehicle. The battery management system can select a charging profile from the plurality of charging profiles for the battery of the electric vehicle based on the state of charge of the battery, the temperature value and the current value. The battery management system can set a C-rate to charge the battery of the electric vehicle based on the charging profile from the plurality of charging profiles.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of managing battery performance of a vehicle. The various concepts introduced above and discussed in greater detail below may be implemented in any of numerous ways.

The present disclosure is directed to managing battery performance of an electric vehicle by controlling the charging conditions of the battery. Charging of electric vehicle lithium-ion (Li-ion) battery cells can be challenging due to constraints related to performance or degradation of the battery. For example, under some conditions (e.g., at specific temperatures), charging of the Li-ion battery can cause the deposition of lithium onto the anode of the battery. Lithium deposition on the anode can lead to performance degradation such as, shorter charging cycles, shorter battery life, or internal short-circuiting of the cell. The internal short-circuiting of the cell can lead to heat generation that can cause battery cell failure. The lithium deposition can also lead to degradation mechanisms such as loss of lithium inventory, increased cell impedance, and loss of electrical contact within the anode, among others. Detecting lithium deposition can be difficult in-situ. Additionally, testing or detecting lithium deposition in-situ can be cost and spaceprohibitive because it can be difficult to add the sensors to functioning batteries need to detect lithium plating. Accordingly, battery management systems may not consider the battery's current conditions when setting charging rates, such as C-rates, which can lead to degradation and performance issues of the battery.

The battery management system described herein can include a plurality of charging profiles. The battery management system can select a charging profile based on current environmental and battery conditions and charge the battery based on the selected charging profile. The charging profile can include charging rate, C-rate, or other charging characteristics. The battery management system can receive input signals from one or more sensors that can enable the battery management system to model lithium deposition and select a charging profile based the data from the one or more sensors. Based on the selected charging profile, the battery management system can set the C-rate (or applied current/current density) for charging the battery. The battery management system can limit the charge current based on the charging profile to taper the current as the charging conditions approach conditions where lithium deposition may occur. The C-rate can be a normalized charging rate. The C-rate can be normalized against the battery's capacity. The C-rate can be a measure of the rate at which the battery can be charged or discharged relative to the battery's maximum capacity. For example, at a 1C C-rate, a battery will discharge the entirety of the battery's capacity in 1 hour.

Figure 1:
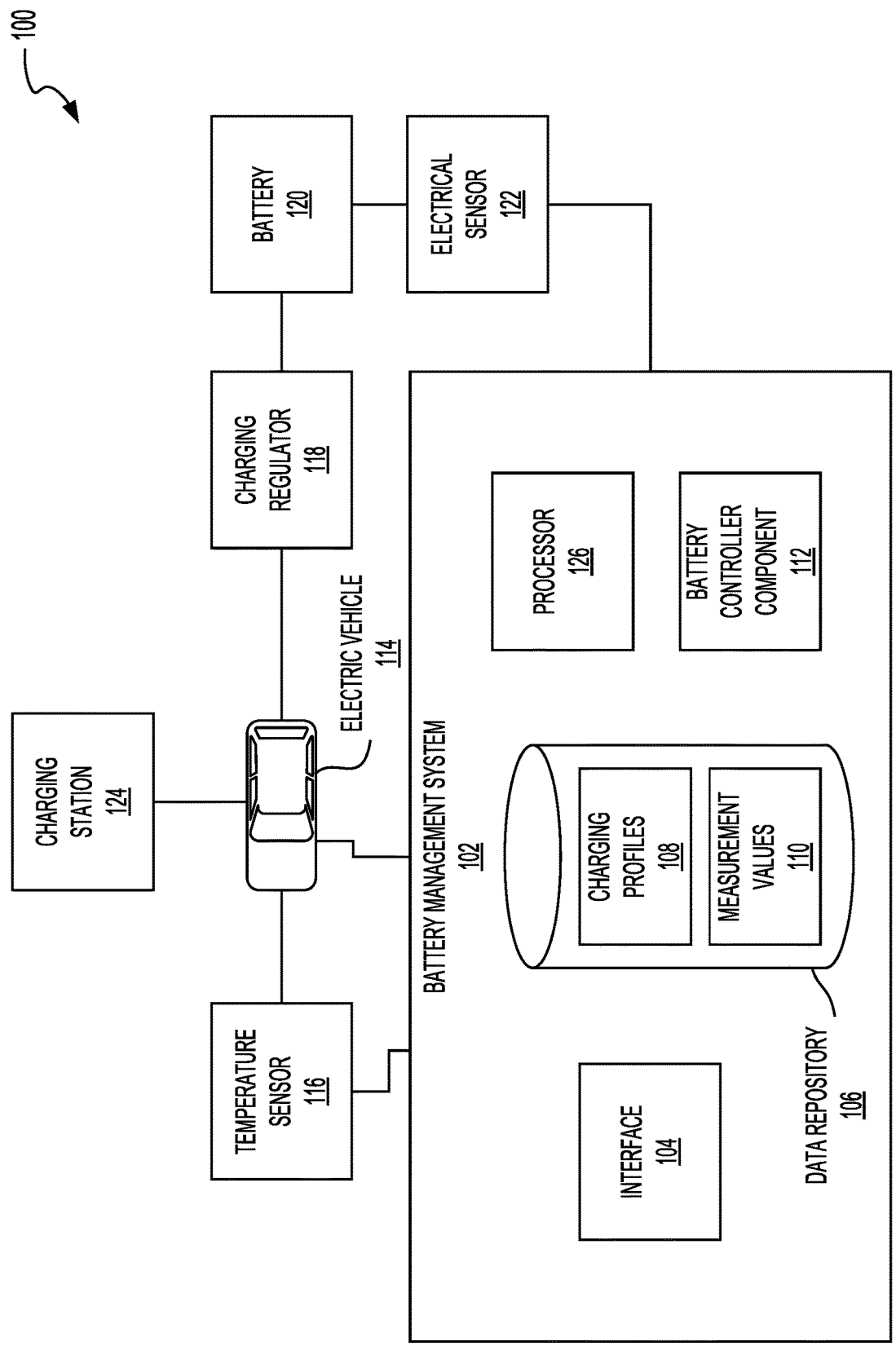
FIG. 1 illustrates a block diagram of an example system to manage battery performance of an electric vehicle.

FIG. 1 illustrates a block diagram of an example system 100 to manage battery performance of an electric vehicle. The system 100 can include at least one electric vehicle 114. The electric vehicle 114 can refer to any type of vehicle or automobile such as cars, trucks, vans, sports utility vehicles, motorcycles, self-driving vehicle, driver assist vehicle, electric vehicle, hybrid vehicle, or fossil fuel powered vehicle. The electric vehicle 114 can include at least one battery management system 102 to measure battery and environmental conditions and select parameters to change the battery. The battery management system 102 can include at least one interface 104 for interacting with components of the electric vehicle 114. The battery management system 102 can include at least one battery controller component 112 that can be executed by at least one processor 126. The battery management system 102 can include at least one data repository 106 that can include one or more charging profiles 108 and measurement values 110. The electric vehicle 114 can include sensors, such as one or more temperature sensor 116 and one or more battery controller component 112. The electric vehicle 114 can include one or more batteries 120 and one or more charging regulators 118. The batteries 120 of the electric vehicle 114 can be charged by at least one charging station 124.

The system 100 can include a battery management system 102. The battery management system 102 can be configured, designed, constructed, or operational to receive inputs (e.g., electrical characteristics of the battery 120 and temperature values) and select a charging profile based on the inputs. The battery management system 102 can configure the charging regulator 118 to charge the battery 120 based on the selected charging profile. For example, the battery management system 102 can set a C-rate for charging the battery 120 based on the one or more inputs.

The battery management system 102 can include one or more interfaces 104, one or more processors 126, and one or more battery controller components 112. The battery management system 102 can include (or can have access to) a data repository 106 in which charging profiles 108 and measurement values 110 are stored. The battery management system 102, or one or more component thereof, can include hardware or a combination of hardware and software. For example, the battery management system 102 can include communications buses, circuitry, communications interfaces, among others. The battery management system 102 can reside in totality or in part on or within a vehicle (e.g., vehicle 114), on a computing device, on a server, or other location or hardware infrastructure to facilitate vehicle or battery control, design, or manufacturing. For example, the battery controller component 112 can be a component of a remote server. For example, one or more charging profiles 108 can be stored remotely from the electric vehicle 114 (e.g., in a remote server). The battery management system 102 can collect measurement values 110, which the battery management system 102 can transmit to the remote server. The components of the battery controller component 112 located at the remote server can remotely process the measurement values 110 and return a control signal to the components of the battery management system 102 located at the electric vehicle 114 for setting the charging regulator 118. The charging regulator can control the C-rate (or other charging characteristic) from the charging station 124 to the battery 120.

The battery management system 102 can include one or more battery controller components 112. The battery controller component 112 can be or include an application, applet, script, service, daemon, routine, or other executable logic to control the charging of the battery 120 by the charging station 124. The battery controller component 112 can be referred to as a main component, orchestrator component, or master component. The battery controller component 112 can orchestrate, manage, or maintain one or more other components of the battery management system 102. The battery controller component 112 can receive the signals from the temperature sensor 116 and the electrical sensor 122 and store the signals in the data repository 106 as measurement values 110.

The battery controller component 112 can select one or more charging profiles 108 from the data repository 106. The battery controller component 112 can select the charging profiles 108 from the data repository 106 based on the signals received from the sensors (e.g., the temperature sensor 116 and the electrical sensor 122) or received from the data repository 106. For example, and described in relation to FIG. 3, among others, the charging profiles 108 can be stored in the data repository 106 as a lookup table. The lookup table can be a multidimensional lookup table. For example, the lookup table can include a plurality of rows—each for a different state of charges (SoCs)—and a plurality of columns—each for a different temperature. For an input temperature and SoC, the battery controller component 112 can select the charging profile 108 at the intersection of the SoC row and temperature column. When a charging profile 108 is selected, the battery management system 102 can configure or set, via the battery controller component 112, a C-rate of the charging regulator 118. The charging regulator 118 can limit the C-rate with which the charging station 124 can charge the battery 120.

The electric vehicle 114 can include one or more sensors. The electric vehicle 114 can include one or more electrical sensors 122 and temperature sensors 116, which can generally be referred to as sensors. The temperature sensor 116 can be a temperature sensor designed, constructed, configured, or operational to measure a temperature of the battery environment. The battery environment can be the environment around the battery 120, such as the temperature of an external surface of the battery 120, the environmental temperature in close proximity to the battery 120 (e.g., within 2 ft, 1 ft, 10 in, 6 in, or 3 in), the environmental temperature in a battery compartment of the electric vehicle 114, of the temperature within the interior of the battery 120. The electric vehicle 114 can include a plurality of temperature sensors 116. For example, the electric vehicle 114 can include a first temperature sensor 116 that can measure the temperature in the battery environment and a second temperature sensor 116 that can measure a temperature external to the electric vehicle 114. The electric vehicle 114 can include or be associated with one or more external temperature sensor 116. For example, the electric vehicle 114 can receive an external temperature from a weather service that can provide the temperature value to the electric vehicle 114 via a data network. The temperature sensor 116 can include a thermistor (e.g., a negative temperature coefficient thermistor), a resistance temperature detector, a thermocouple, a semiconductor-based temperature sensor, infrared temperature sensors, or a combination thereof.

The battery management system 102 can measure the temperature in the battery environment (or other location) with the temperature sensor 116. For example, the battery management system 102 can be connected with the temperature sensor 116 through the interface. The temperature sensor 116 can generate an electrical signal that is proportional to the temperature in the battery environment. The battery management system 102 can sample the signal at a predetermined rate and store the digitized signal in the data repository 106 as one of the measurement values 110. The temperature sensor 116 can generate a digital signal that the temperature sensor 116 transmits to the battery management system 102. The battery management system 102 can store the digital signal in the data repository 106 as one of the measurement values 110.

The electric vehicle 114 can include one or more electrical sensors 122. The electrical sensors 122 can be designed, constructed, configured, or operational to detect one or more battery characteristics. For example, the electrical sensor 122 can detect a value of a current output from the battery 120. The electrical sensor 122 can include an ammeter, volt meter, or multimeter. The electrical sensor 122 can measure current, such as a flow of an electric charge or electric discharge. The electrical sensor 122 can include one or more sensor devices to measure, detect, or determine characteristics of electricity associated with a battery 120 of the vehicle. For example, the electrical sensor 122 can measure, detect, or determine one or more of a current, voltage, or impedance of the battery 120. The electrical sensor 122 can measure, detect, or determine a state-of-charge (SoC) of the battery 120. The electrical sensor 122 can indirectly measure the SoC of the battery 120. For example, the electrical sensor 122 can determine the voltage of the battery 120. The electrical sensor 122 or the battery management system 102 can reference a discharge lookup table that equate voltages to predicted SoCs. The discharge lookup table can be multidimensional and also include indexes for temperature and current. That is, the electrical sensor 122 or the battery management system 102 can determine the SoC based on the voltage, current temperature, battery current, or a combination thereof. The electrical sensor 122 can determine the SoC by measuring the battery current and integrating the battery current over time to perform coulomb counting.

The battery management system 102 can measure one or more electrical characteristics of the battery 120 with the electrical sensor 122. For example, the battery management system 102 can be connected with the electrical sensor 122 through the interface 104. The electrical sensor 122 can generate an electrical output signal that indicates the value of the measured electrical characteristic. The battery management system 102 can sample the signal at a predetermined rate and store the digitized signal in the data repository 106 as one of the measurement values 110. The electrical sensor 122 can generate a digital signal that the electrical sensor 122 transmits to the battery management system 102. The battery management system 102 can store the digital signal in the data repository 106 as one of the measurement values 110.

The electric vehicle 114 can include one or more batteries 120. The battery 120 can be a rechargeable battery. The battery 120 can be recharged by the charging station 124. The battery can include one or more battery cells. For example, the battery 120 can refer to multiple battery cells or batteries. The multiple battery cells can be independent from one another but stored in a same physical container or area. The multiple battery cells of the battery 120 can be electronically or communicatively coupled to on another. For example, the one or more battery cells in the battery 120 can be connected by electronic circuitry in a series or in a parallel configuration. The battery management system 102 can monitor, manage, or control aspects of the battery 120.

The battery 120 can include one or more cells. A cell can refer to the electrochemical current-producing unit in a battery, consisting of a set of positive plates, negative plates, electrolyte, separators and casing. The cell can have an open-circuit voltage of, for example, 1 volt, 2 volts, 3 volts, volts or some other voltage. There can be multiples cells in a single battery 120. Types of batteries 120 or battery cells can include, for example, lead-acid ("flooded," deep-cycle, and VRLA), NiCd, nickel-metal hydride, lithium-ion, Li-ion polymer, zinc-air or molten-salt batteries.

The battery 120 can include one or more battery cells. The battery cells can be lithium-air battery cells, lithium ion battery cells, nickel-zinc battery cells, zinc-bromine battery cells, zinc-cerium battery cells, sodium-sulfur battery cells, molten salt battery cells, nickel-cadmium battery cells, or nickel-metal hydride battery cells, among others. The battery cell can include at least one housing. The housing can be included in or part of a battery pack (e.g., a battery array or battery module) installed a chassis of the electric vehicle 114. The housing can have the shape of a cylindrical casing or cylindrical cell with a circular, ovular, or elliptical base. A height of the housing can be greater than a diameter of the housing. For example, the housing can have a length (or height) of 65 mm to 75 mm, inclusive and a maximum width (or diameter for circular examples) of 17 mm to 25 mm, inclusive. In some examples the width or diameter of the housing can be greater than the length (e.g., height) of the housing. The housing can be formed from a prismatic casing with a polygonal base, such as a triangle, square, a rectangular, a pentagon, or a hexagon, for example. A height of such a prismatic cell housing can be less than a length or a width of the base of the housing.

The housing of the battery cell can include at least one electrically or thermally conductive material, or combinations thereof. The electrically conductive material can also be a thermally conductive material. The electrically conductive material for the housing of the battery cell can include a metallic material, such as aluminum, an aluminum alloy with copper, silicon, tin, magnesium, manganese or zinc (e.g., of the aluminum 4000 or 5000 series), iron, an iron-carbon alloy (e.g., steel), silver, nickel, copper, and a copper alloy, among others. The electrically conductive material and thermally conductive material for the housing of the battery cell can include a conductive polymer. To evacuate heat from inside the battery cell, the housing can be thermally coupled to a thermoelectric heat pump (e.g., a cooling plate) via an electrically insulating layer. The housing can include an electrically insulating material. The electrically insulating material can be a thermally conductive material. The electrically insulating and thermally conductive material for the housing of the battery cell can include a ceramic material (e.g., silicon nitride, silicon carbide, titanium carbide, zirconium dioxide, beryllium oxide, and among others) and a thermoplastic material (e.g., polyethylene, polypropylene, polystyrene, or polyvinyl chloride), among others. To evacuate heat from inside the battery cell, the housing can be thermally coupled to a thermoelectric heat pump (e.g., a cooling plate). The housing can be directly thermally coupled to the thermoelectric heat pump without an addition of an intermediary electrically insulating layer.

The housing of the battery cell can include a first end (e.g., top portion) and a second end (e.g., bottom portion). The housing can define an inner region between the first end and the second end. For example, the inner region can include an interior of the housing. The first end, inner region, and the second end can be defined along one axis of the housing. For example, the inner region can have a width (or diameter for circular examples) of about 2 mm to about 6 mm and a length (or height) of about 50 mm to about 70 mm.

The first end, inner region, and second end can be defined along a vertical (or longitudinal) axis of cylindrical casing forming the housing. The first end can be at one end of the housing and the second end can be at an opposite end of the housing. The end of the second end can encapsulate or cover the corresponding end of the housing.

At least one electrolyte can be disposed in the inner region of the housing. The electrolytes can include a negative electronic charge region or terminus and a positive electronic charge region or terminus. At least one negative tab can couple the electrolytes (e.g., negative region of electrolytes) with the surface of the housing or the negative lid portion of the lid.

The electrolyte can include any electrically conductive solution, dissociating into ions (e.g., cations and anions). For a lithium-ion battery cell, for example, the electrolyte can include a liquid electrolyte, such as lithium bisoxalatoborate ($LiBC_4O_8$ or LiBOB salt), lithium perchlorate ($LiClO_4$), lithium hexaflourophosphate ($LiPF_6$), and lithium trifluoromethanesulfonate ($LiCF_3SO_3$). The electrolyte can include a polymer electrolyte, such as polyethylene oxide (PEO), polyacrylonitrile (PAN), poly(methyl methacrylate) (PMMA) (also referred to as acrylic glass), or polyvinylidene fluoride (PVdF). The electrolyte can include a solid-state electrolyte, such as lithium sulfide ($Li_2S$), magnesium, sodium, and ceramic materials (e.g., beta-alumna).

Multiple electrolytes (e.g., two electrolytes, more than two electrolytes) can be disposed within inner region of the housing. For example, two electrolytes can be disposed within inner region of the housing. The number of electrolytes can vary and can be selected based at least in part on a particular application of the battery cell.

A lithium-ion battery or Li-ion battery (abbreviated as LIB) can be a rechargeable battery in which lithium ions move from the negative electrode to the positive electrode during discharge and back when charging. Li-ion batteries use an intercalated lithium compound as one electrode material, compared to the metallic lithium used in a non-rechargeable lithium battery. The electrolyte, which allows for ionic movement, and the two electrodes are the constituent components of a lithium-ion battery cell. For example, lithium-ion battery can be used to provide power to an electric vehicle 114. A lithium-ion battery can have a high energy density, low memory effect, and a low self-discharge. Types of lithium-based batteries 120 can include, for example, Lithium iron phosphate ($LiFePO_4$), lithium ion manganese oxide battery ($LiMn_2O_4$, $Li_2MnO_3$, or LMO), and lithium nickel manganese cobalt oxide ($LiNiMnCoO_2$ or NMC), lithium nickel cobalt aluminum oxide ($LiNiCoAlO_2$ or NCA) and lithium titanate ($Li_4Ti_5O_{12}$ or LTO), or lithium-sulfur batteries.

The battery management system 102 can include one or more data repositories 106. The data repository 106 can be or can include memory (e.g., hardware) in which the battery management system 102 can store data and machine instructions. When the battery management system 102 execute the machine instructions with, for example, the processor 126, the battery management system 102 can perform the operations described herein. The memory can include a floppy disk, CD-ROM, DVD, magnetic disk, memory chip, ROM, RAM, EEPROM, EPROM, flash memory, optical media, or any other suitable memory from which the processor 126 can read instructions or data. The instructions can include code from any suitable computer programming language such as, but not limited to, C, C++, C #, Java, JavaScript, Perl, HTML, XML, Python and Visual Basic.

The battery management system 102 can store one or more charging profiles 108 in the data repository 106. The charging profiles 108 can be or include at least one data structure. The data structure can be or can include a lookup table, array, matrix, or other data structure. The charging profiles 108 can include a multidimensional lookup table. For example, the lookup table can include a time or age dimension, a SoC dimension, and a temperature dimension, among others. The battery controller component 112 can provide one or more values of the dimensions to the lookup table to select a charging profile 108. Each charging profile 108 can indicate a rate at which the battery 120 should be charged. The charging profile 108 can reduce the overheating, shorting, or the occurrence of lithium plating in the battery management system 102. For example, the charging profile 108 can set an upper limit for the C-rate, current, voltage, or time at which the battery 120 is charged given a set of input values (e.g., temperature and current SoC).

The battery management system 102 can include interfaces 104. For example, the interfaces 104 can include or use one or more protocols, wires, connectors, or ports to communicate with or facilitate communication among the components of the system 100. For example, the battery management system 102 can be in electrical communication with the temperature sensor 116 and the electrical sensor 122 via an interface 104. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can facilitate translating or formatting data from one format to another format. For example, interface 104 can include an analog to digital converter that can convert analog signals from the temperature sensor 116 or electrical sensor 122 into signal signals that the battery controller component 112 can save into the data repository 106 as measurement values 110. The interface 104 can interact with components external to the electric vehicle 114. For example, the interface 104 can interface with the charging station 124 to control the rate at which the charging station 124 charges the battery 120.

The system 100 can include one or more charging stations 124. The charging station 124 can be a charger configured to charge rechargeable batteries. For example, the charging station 124 can electrically couple with the battery 120 to charge the battery 120. For example, the charging station 124 can include one or more units that include charging cables that can couple to charging ports on the electric vehicle 114 to deliver electricity from the charging station 124 to the electric vehicle 114. The electric vehicle 114 can be parked when charged. The electric vehicle 114 can be turned off or turned on when charged by the charging station 124. The charging station 124 can provide the battery 120 with current at a predetermined C-rate to charge the battery 120. The charging station 124 can be electrically coupled with an external power source to receive power. For example, the charging station 124 can be coupled with a municipal power grid, generator, solar panels, batteries, or other form of power source. The charging station 124 can include a charging port that can couple with a charging port of the electric vehicle 114 to provide power to the electric vehicle 114 to recharge the battery 120.

The charging station 124 can charge the battery 120 at a plurality of rates (e.g., C-rates). For example, the charging station 124 can provide the electric vehicle 114 with power at different current and voltage levels to control the speed at which the battery 120 is charged by the charging station 124. The electric vehicle 114 can include a charging regulator 118 that can control, limit, or configure the rate at which the charging station 124 charges the battery 120. For example, the battery controller component 112 can select a charging profile 108 that includes a C-rate for the current conditions of the electric vehicle 114. The battery controller component 112 can configured the charging regulator 118 to set the C-rate at which the battery 120 is charged. The charging regulator 118 can be a component of the charging regulator 118 that is in electrical communication with the charging station 124. The charging regulator 118 can be a component of the charging station 124 that is in electrical communication with the battery controller component 112.

Figure 2:
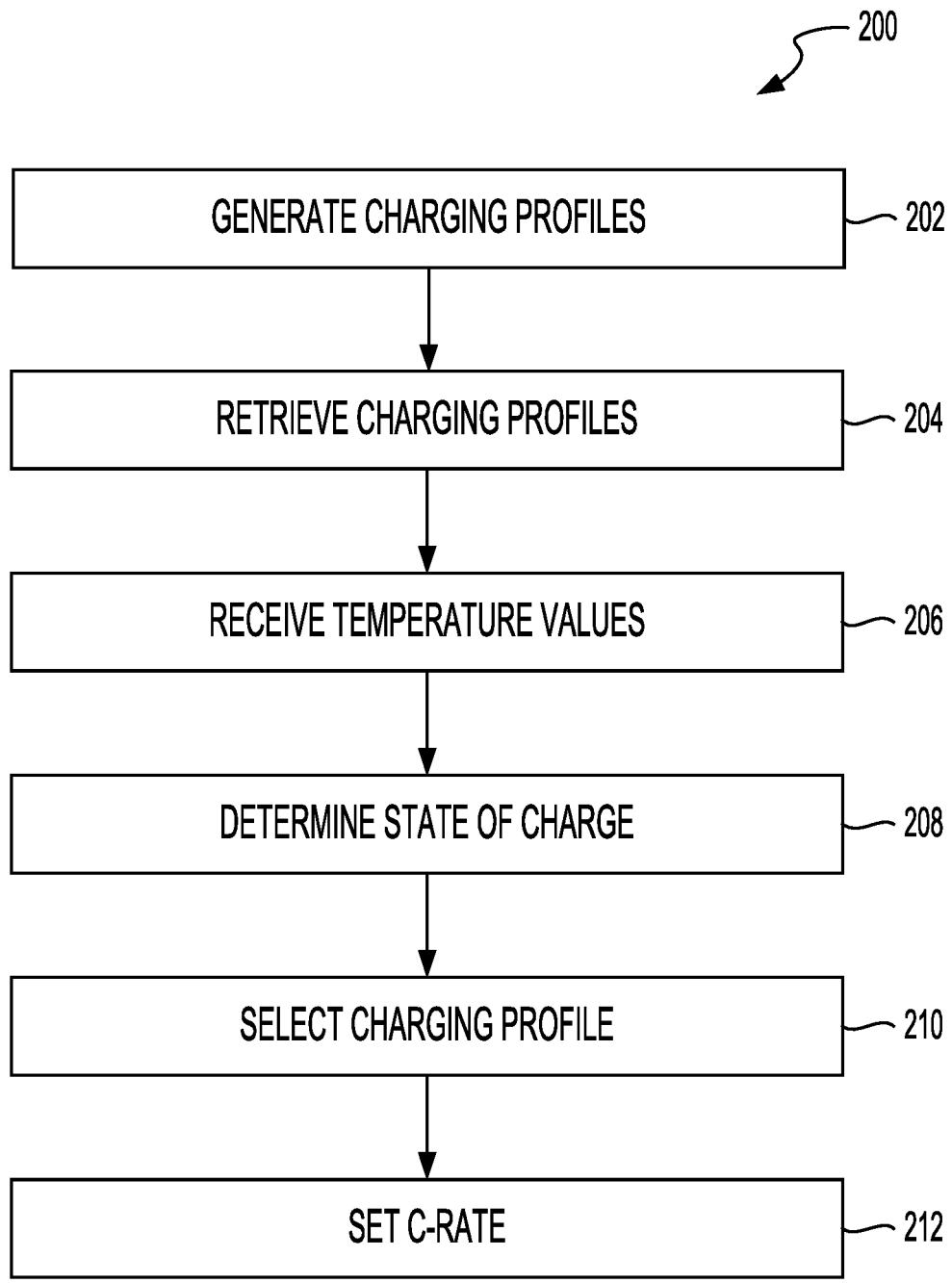
FIG. 2 illustrates an example method 200 to manage battery performance.

FIG. 2 illustrates an example method 200 to manage battery performance. The method 200 can include generating charging profiles (ACT 202). The method 200 can include retrieving charging profiles (ACT 204). The method 200 can include receiving temperature values (ACT 206). The method 200 can include determining a state of charge (ACT 208). The method 200 can include selecting a charging profile (ACT 210). The method 200 can include setting a C-rate (ACT 212).

The method 200 can include generating charging profiles 108 (ACT 202). The charging profiles 108 can be generated by a manufacturer of the electric vehicle 114, a manufacturer of the battery 120, or other party. The charging profiles 108 can indicate for one or more environmental conditions or conditions of the battery 120, parameters for charging the battery 120. The parameters can include a C-rate, charging voltage, charging current, target (or max) charged voltage, charge duration (e.g., for how long to charge the battery 120), charge rate, or other parameter for charging the battery 120. The charging profiles 108 can be stored as a lookup table.

The electric vehicle 114 can store or access a plurality of lookup tables. For example, the electric vehicle 114 can include a lookup table for each of a plurality of different batteries types or configurations. For example, when a battery 120 is installed in the electric vehicle 114, a lookup table associated with the installed battery's battery type, model type, or configuration can be stored in the data repository 106. Each lookup table can be specific to a specific battery configuration, which can be based on the battery's specific cell type, geometries, internal pressures, compositions, structures, chemistries, manufacturer, or a combination thereof.

The lookup tables can be generated by, for each of the different battery types or configurations, constructing a three-electrode cell. For each of the battery types or configurations, an instance of the battery can be dissected to harvest one or more components from the instance of the battery. Components such as, but not limited to, the battery's anode, cathode, separators, and electrolyte can be harvested from the battery. The battery can be harvested within a glovebox or enclosure that provides an inert atmosphere. For example, the glovebox can be filled with argon. The inert atmosphere can reduce the components exposure to oxygen or water.

Figure 3:
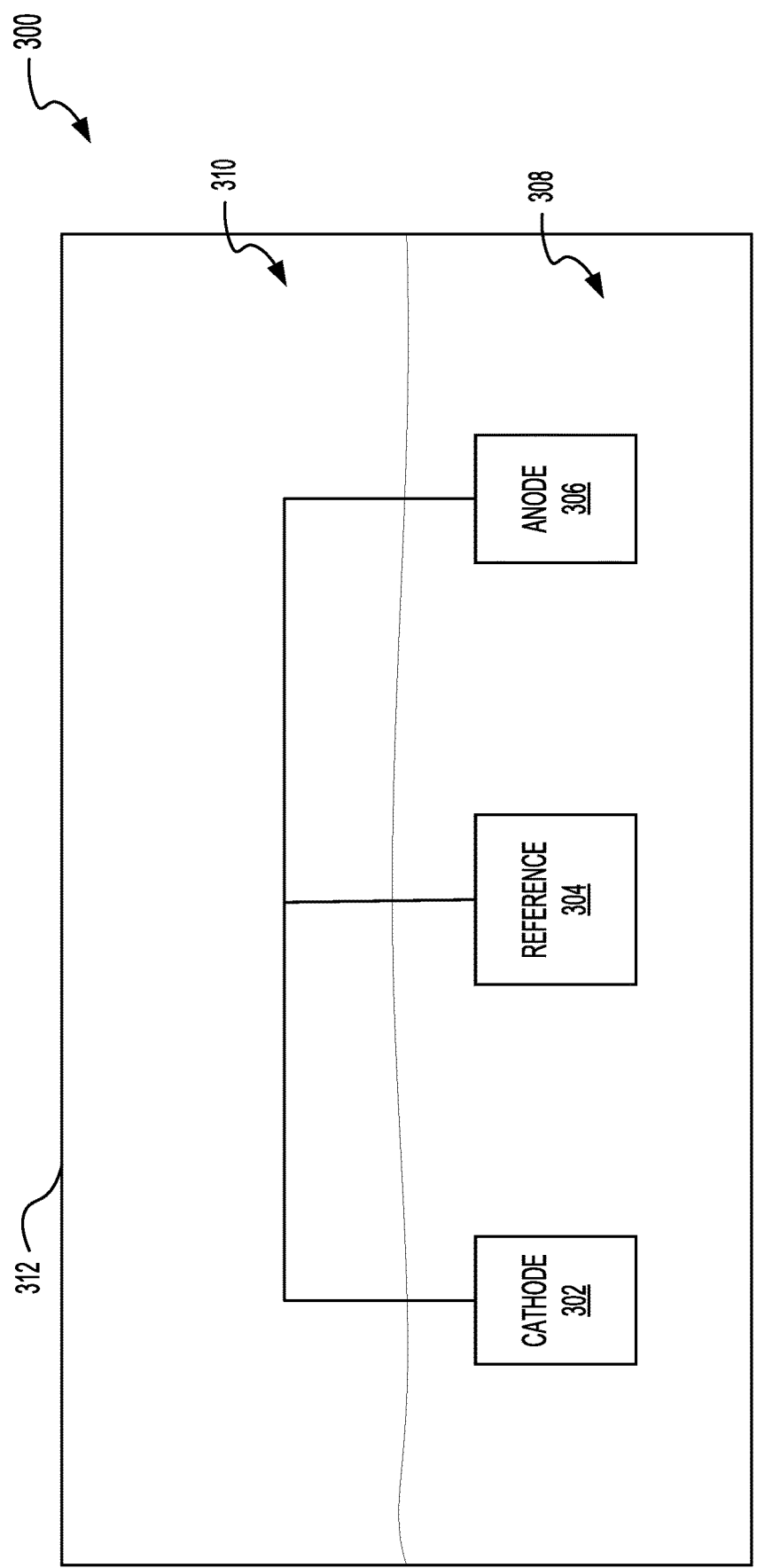
FIG. 3 illustrates a block diagram of an example three-electrode cell.

FIG. 3 illustrates a block diagram of an example three-electrode cell 300. The three-electrode cell 300 can include a cathode 302, a reference 304, and an anode 306. The cathode 302, the reference 304, and the anode 306 can be contained within an enclosure 312. The cathode 302, the reference 304, and the anode 306 can be at least partially submerged in electrolyte 308. The enclosure 312 can also be filled with a gas 310, which can be inert. The cathode 302, the reference 304, the anode 306, and the electrolyte 308 can be harvested from an instance of the same type of battery that is included in the electric vehicle 114. For example, a battery can be dissected to extract battery components from the battery. The battery components can be used to construct the three-electrode cell 300. The three-electrode cell 300 can include a separator that separates the cathode 302 and the anode 306. The anode 306 can be configured as or coupled with the negative terminal of the three-electrode cell 300, the cathode 302 can be configured as or coupled with the positive terminal of the three-electrode cell 300. The reference 304 can include lithium. Voltage, current, and other electrical measurements can be made at the cathode 302 or the anode 306 with reference to the reference 304.

Referring to FIGS. 2 and 3, among others, the three-electrode cell 300 can be charged and discharged under different conditions to generate data to generate the charging profiles. For example, the different conditions can include over different durations of time, starting at different SoCs, at different voltages, at different applied currents, and under different temperatures. The system 100 can generate a charging profile 108 for each of the different sets of conditions. For example, the system 100 can receive a first measurement signal that can include at least one of current values, voltage values, and time values while charging and discharging the three-electrode cell 300 under a first set of conditions. The values of the measurement signal can be used to generate the charging profile 108 for the tested set of conditions. The tests can be repeated to determine when (or if) lithium deposition has occurred. The charging profile 108 can include a C-rate threshold that limits the occurrence of lithium deposition under the battery 120 is charged under the given set of conditions. The plurality of charging profiles 108 can be stored in the data repository 106 as a lookup table that indicates, for each of a plurality of different conditions, which C-rate should be used when charging the battery 120. For example, the battery management system 102 can determine the current temperature and SoC of the battery 120.

The battery 120 can use the temperature-SoC pair as an input to retrieve the charging profile 108 for the current conditions.

Referring to FIG. 2, among others, the method 200 can include retrieving a charging profile (ACT 204). The electric vehicle's data repository 106 can include a plurality of charging profiles 108 stored in a lookup table, for example. The battery management system 102 can retrieve, from the data repository 106, the lookup table. Each of the charging profile 108 can indicate a C-rate or charging rate for charging the battery 120 given a set of input parameters, such as temperature and SoC.

The method 200 can include receiving or determining a temperature (ACT 206). The battery management system 102 can determine the temperature of the electric vehicle's battery environment based on a signal that includes temperature values that are received by the battery management system 102 from the temperature sensor 116. The battery environment can include a space in close proximity to the battery (e.g., within 2 ft, 1 ft, 6 in, or 3 in), the space within a battery compartment, or a temperature within the battery.

The battery management system 102 can receive additional measurement signals from one or more additional sensors. For example, the battery management system 102 can receive a signal from an electrical sensor 122 that can include current values that indicate a current flow of the battery, voltage values that indicate a voltage level of the battery, SoC values that indicate a SoC level of the battery, or other electrical properties of the battery 120. The battery management system 102 can determine a battery type for the battery. For example, when the battery is installed in the electric vehicle 114, the battery's make a model number can be provided to the battery management system 102. The battery management system 102 can determine the age of the battery 120. The age of the battery 120 can be time-based or cycle-based. For example, when a new battery 120 is installed in the electric vehicle 114, the battery management system 102 can reset a timer that runs when the electric vehicle 114 is in operation. The value of the timer can indicate the age of the battery 120. The age of the battery can be based on a number of charging cycles. For example, the battery management system 102 can count the number of charging and discharging cycles the battery 120 has experienced.

The method 200 can include determine a SoC of the battery (ACT 208). As described above, the electrical sensor 122 can measure or determine one or more of the battery's operating characteristics or parameters. One of the parameters can be the battery's SoC. The electrical sensor 122 can transmit a signal that can include values that indicate the battery's SoC to the battery management system 102. The electrical sensor 122 can determine or calculate the SoC based on values received or measured by the electrical sensor 122 and temperature sensor 116. For example, the battery controller component 112 can calculate a SoC value based on a voltage value received from the electrical sensor 122 and a temperature value received from the temperature sensor 116.

The method 200 can include selecting a charge profile (ACT 210). The battery management system 102 can select the charge profile from the plurality of charge profile that are included in lookup table stored on the electric vehicle's data repository 106. The battery controller component 112 can select the charging profile 108 based on one or more of the SoC of the battery 120, the voltage of the battery 120, the current of the battery 120, and the temperature of the battery environment. For example, the electrical sensor 122 can use a temperature value and a SoC value as temperature-SoC pair for selecting the charging profile 108 from a lookup table that includes temperature in a first dimension and SoC in a second dimension.

Figure 4:
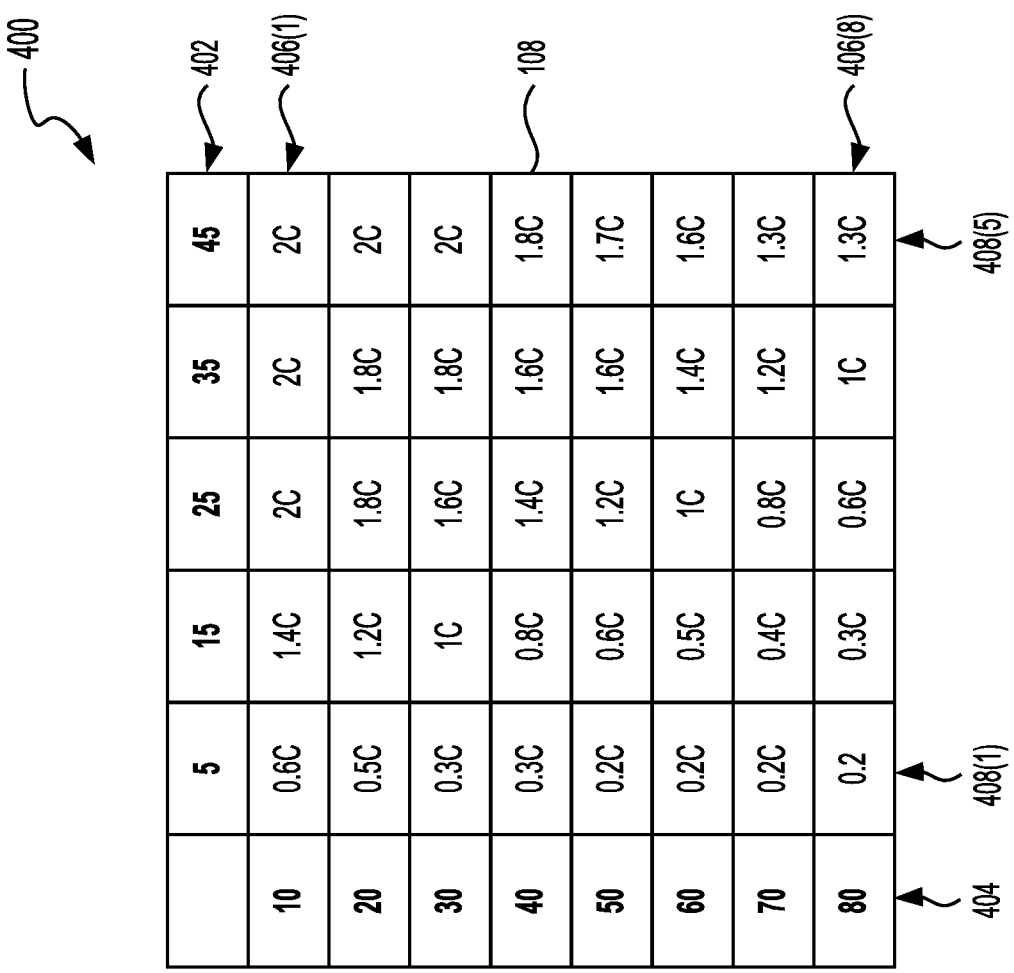
FIG. 4 illustrates an example lookup table.

For example, and also referring to FIG. 4, FIG. 4 illustrates an example lookup table 400. The lookup table 400 can include a plurality of charging profiles 108. Each of the charging profiles 108 can include a C-rate value. The lookup table 400 can include a first index 402 (which can also be referred to herein as a dimension) that includes a plurality of columns 408(1) to columns 408(5). In the example lookup table 400 illustrated in FIG. 4, each value of the index 402 can correspond to a different temperature value in degrees Celsius (° C.). For example, the column 408(1) corresponds to a temperature of 5 C and the column 408(5) corresponds to a temperature of 45 C. The lookup table 400 can include a second index 404 that includes a plurality of rows 406(1) to rows 406(8). In the example lookup table 400, each value of the index 404 can correspond to a different SoC value. For example, the row 406(1) corresponds to a SoC of 10% and the row 406(8) corresponds to a SoC of 80%. The lookup tables storing the plurality of charging profiles 108 can have a resolution higher or lower to that of the lookup table 400 illustrated in FIG. 4. For example, a lookup table with a higher resolution could include an index 404 with a value every 5% points rather than every 10% points. When the battery controller component 112 receives an input value that is between two of the values of a given index (e.g., an input SoC is 63), the battery controller component 112 can round the input value up, down, to the closest value of the given index, or the battery controller component 112 can interpolate a charging profile 108 between the two values. For the example lookup table 400, the battery controller component 112 can use a temperature-SoC pair to retrieve a charging profile 108 from the lookup table 400. For example, if the temperature-SoC pair is 45° C.-80, the battery controller component 112 would select the charging profile 108 at the intersection of the column 408(5) and the row 406(8) and select the charging profile 108 with a C-rate of 1.3C.

The lookup table can include more than two dimensions such that the charging profile 108 can be selected based on inputs in addition to or in place of the temperature and SoC. For example, lookup table can include a dimension of current values such that the battery management system 102 can select the charging profile 108 based on a current value. The lookup table can include a dimension of battery types or configures such that the battery management system 102 can select the charging profile 108 based on the battery type or configuration. The lookup table can include a dimension of battery age (as measured by a number of charge-discharge values or time) such that the battery management system 102 can select the charging profile 108 based on the battery's age.

Referring to FIG. 2, among others, the method 200 can include setting the C-rate (ACT 212). The battery controller component 112 can set the C-rate for charging the battery 120 by configuring the charging regulator 118 or the charging station 124. setting a C-rate of the battery of the electric vehicle based on the charging profile from the plurality of charging profiles. For example, the charging regulator 118 can be configured such that the C-rate indicated by the selected charging profile 108 is the maximum C-rate with which the battery 120 is charged for a given period of time. The battery management system 102 can repeat the ACTs 204 to 212 a plurality of times during the charging cycle. For example, the battery management system 102 can repeat the ACTs 204 to 212 every 10 minutes and update the C-rate at which the battery 120 is charged. For example, the battery management system 102 can taper or reduce the C-rate as the battery nears a full SoC (e.g., 100%) or near a condition where lithium plating may occur.

Figure 5:
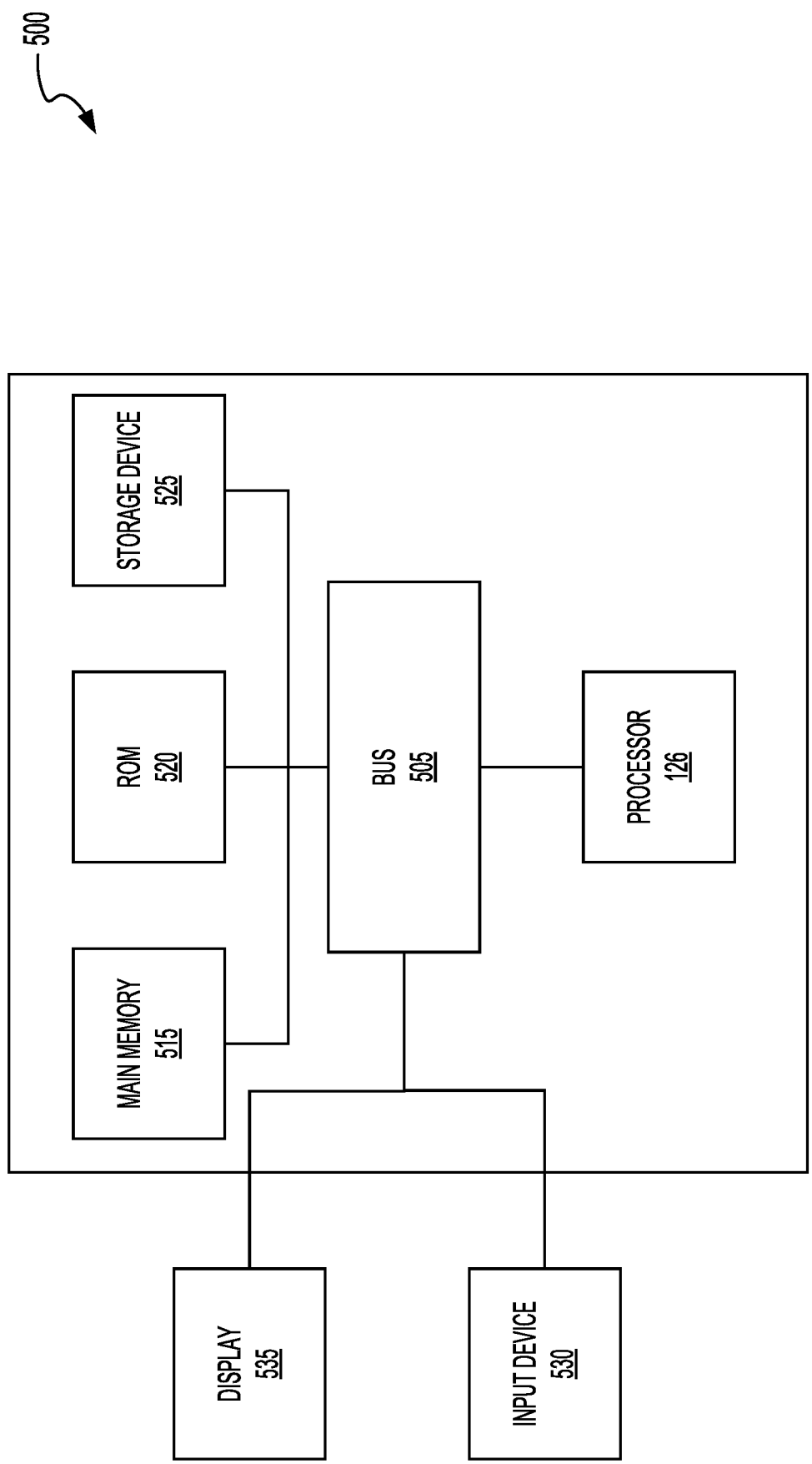
FIG. 5 illustrates a block diagram of an example computer system.

FIG. 5 illustrates a block diagram of an example computer system 500. The computer system or computing device 500 can include or be used to implement the battery management system 102, or its components such as the battery management system 102. The computing system 500 includes at least one bus 505 or other communication component for communicating information and at least one processor 126 or processing circuit coupled to the bus 505 for processing information. The computing system 500 can also include one or more processors 126 or processing circuits coupled to the bus for processing information. The computing system 500 also includes at least one main memory 515, such as a random-access memory (RAM) or other dynamic storage device, coupled to the bus 505 for storing information, and instructions to be executed by the processor 126. The main memory 515 can be or include the data repository 106. The main memory 515 can also be used for storing position information, vehicle information, command instructions, vehicle status information, environmental information within or external to the vehicle, road status or road condition information, or other information during execution of instructions by the processor 126. The computing system 500 may further include at least one read only memory (ROM) 520 or other static storage device coupled to the bus 505 for storing static information and instructions for the processor 126. A storage device 525, such as a solid-state device, magnetic disk or optical disk, can be coupled to the bus 505 to persistently store information and instructions. The storage device 525 can include or be part of the data repository 106.

The computing system 500 may be coupled via the bus 505 to a display 535, such as a liquid crystal display, or active matrix display, for displaying information to a user such as a driver of the electric vehicle 114. An input device 530, such as a keyboard or voice interface may be coupled to the bus 505 for communicating information and commands to the processor 126. The input device 530 can include a touch screen display 535. The input device 530 can also include a cursor control, such as a mouse, a trackball, or cursor direction keys, for communicating direction information and command selections to the processor 126 and for controlling cursor movement on the display 535. The display 535 (e.g., on a vehicle dashboard) can be part of the battery management system 102 or other part of the electric vehicle 114.

The processes, systems and methods described herein can be implemented by the computing system 500 in response to the processor 126 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module or component implementation elements include sensors providing any value determined herein, sensors providing any value that is a precursor to a value determined herein, datalink, or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a data repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed:

1. A system to manage battery charging of a battery of an electric vehicle, comprising:
    a data repository in communication with a battery management system, the data repository including a plurality of charging profiles for the battery of the electric vehicle, each of the plurality of charging profiles indicating a respective C-rate;
    a first sensor of the electric vehicle to generate a temperature value to indicate a temperature of a battery environment;
    a second sensor of the electric vehicle to generate a current value to indicate a current of the battery of the electric vehicle; and
    the battery management system comprising one or more processors to:
        receive the temperature value and the current value;
        determine a state of charge of the battery of the electric vehicle;
        select a charging profile from the plurality of charging profiles for the battery of the electric vehicle based on the state of charge of the battery, the temperature value, and the current value; and
        set a C-rate to charge the battery of the electric vehicle based on the charging profile from the plurality of charging profiles;
    the first sensor of the electric vehicle to determine a second temperature value to indicate a second temperature of the battery environment; and
    the battery management system to:
        determine a second state of charge of the battery of the electric vehicle;
        select a second charging profile from the plurality of charging profiles for the battery of the electric vehicle based on the second state of charge of the battery of the electric vehicle and the second temperature of the battery environment; and
        set a second C-rate to charge the battery of the electric vehicle based on the second charging profile from the plurality of charging profiles.

2. The system of claim 1, wherein the C-rate indicates a maximum C-rate to charge the battery of the electric vehicle.

3. The system of claim 1, wherein the C-rate is below a boundary condition for lithium deposition on an anode of the battery of the electric vehicle.

4. The system of claim 1, wherein the plurality of charging profiles comprises:
    a lookup table having a first dimension indicating state of charge values and a second dimension indicating temperature values.

5. The system of claim 1, comprising the battery management system to:
    determine a battery type of the battery of the electric vehicle; and
    select the charging profile from the plurality of charging profiles for the battery of the electric vehicle based on the battery type.

6. The system of claim 1, comprising the battery management system to:
    determine an age of the battery of the electric vehicle; and
    select the charging profile from the plurality of charging profiles for the battery of the electric vehicle based on the age of the age of the battery.

7. The system of claim 1, comprising the battery management system to:
    count a number of charging cycles of the electric vehicle; and
    select the charging profile from the plurality of charging profiles for the battery of the electric vehicle based on the number of charging cycles.

8. A method to manage battery charging of a battery of an electric vehicle, comprising:
    retrieving, from a data repository by a battery management system of the electric vehicle, a plurality of charging profiles for a battery of the electric vehicle, each of the plurality of charging profiles indicating a C-rate;
    receiving, by the battery management system, a temperature value to indicate a temperature of a battery environment;
    determining, by the battery management system, a state of charge of the battery of the electric vehicle;
    selecting, by the battery management system, a charging profile from the plurality of charging profiles for the battery of the electric vehicle based on the state of charge of the battery and the temperature of the battery environment;
    setting a C-rate of the battery of the electric vehicle based on the charging profile from the plurality of charging profiles;
    constructing a three-electrode cell;
    receiving a first measurement signal comprising at least one of current values or voltage values while charging the three-electrode cell under a first set of conditions;
    receiving a second measurement signal comprising at least one of current values or voltage values while discharging the three-electrode cell under the first set of conditions; and
    generating the charging profile from the plurality of charging profiles based on the first measurement signal and the second measurement signal.

9. The method of claim 8, comprising:
receiving, by the battery management system, a current value to indicate a current flow of the battery of the electric vehicle; and
selecting, by the battery management system, the charging profile from the plurality of charging profiles from the battery of the electric vehicle based on the current value.

10. The method of claim 8, wherein the C-rate indicates a maximum C-rate to charge the battery of the electric vehicle.

11. The method of claim 8, comprising:
determining, by a first sensor of the electric vehicle, a second temperature value to indicate a second temperature of the battery environment;
determining, by the battery management system, a second state of charge of the battery of the electric vehicle;
selecting, by the battery management system, a second charging profile from the plurality of charging profiles for the battery of the electric vehicle based on the second state of charge of the battery of the electric vehicle and the second temperature of the battery environment;
setting, by the battery management system, a second C-rate to charge the battery of the electric vehicle based on the second charging profile from the plurality of charging profiles.

12. The method of claim 8, comprising:
selecting the C-rate to be below a boundary condition for lithium deposition on an anode of the battery of the electric vehicle.

13. The method of claim 8, comprising:
determining, by the battery management system, a battery type of the battery of the electric vehicle; and
selecting, by the battery management system, the charging profile from the plurality of charging profiles for the battery of the electric vehicle based on the battery type.

14. The method of claim 8, comprising:
determining, by the battery management system, an age of the battery of the electric vehicle; and
selecting, by the battery management system, the charging profile from the plurality of charging profiles for the battery of the electric vehicle based on the age of the age of the battery.

15. The method of claim 8, comprising:
counting, by the battery management system, a number of charging cycles of the electric vehicle; and
selecting, by the battery management system, the charging profile from the plurality of charging profiles for the battery of the electric vehicle based on the number of charging cycles.

16. The method of claim 8 comprising:
harvesting one or more components from a second instance of the battery of the electric vehicle; and
constructing the three-electrode cell from the one or more components from the second instance of the battery of the electric vehicle.

17. The method of claim 8, comprising:
generating the first measurement signal comprising at least one of the current values or the voltage values while charging the three-electrode cell from a discharged state to a fully charged state; and
generating the charging profile from the plurality of charging profiles based on the first measurement signal.

18. The method of claim 8, comprising:
generating the plurality of charging profiles for each of a plurality of temperature-state of charge pairs.

* * * * *